US007692443B2

(12) United States Patent
Jeon

(10) Patent No.: US 7,692,443 B2
(45) Date of Patent: Apr. 6, 2010

(54) DISPLAY SUBSTRATE AND METHOD OF TESTING THE DISPLAY SUBSTRATE

(75) Inventor: Sang Jin Jeon, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 792 days.

(21) Appl. No.: 11/563,248

(22) Filed: Nov. 27, 2006

(65) Prior Publication Data

US 2007/0120790 A1    May 31, 2007

(30) Foreign Application Priority Data

Nov. 29, 2005    (KR) ............. 10-2005-0114641

(51) Int. Cl.
*G01R 31/00* (2006.01)
(52) U.S. Cl. .................. 324/770; 349/33; 349/192
(58) Field of Classification Search ............. 324/158.1, 324/763–765, 770; 349/33, 192; 438/14, 438/17
See application file for complete search history.

(56) References Cited

U.S. PATENT DOCUMENTS 6,624,857 B1    9/2003    Nagata
6,828,817 B2 *    12/2004    Fujita .................. 324/770
2007/0176623 A1 *    8/2007    Miyake .................. 324/770

* cited by examiner

*Primary Examiner*—Minh N Tang
*Assistant Examiner*—Trung Q Nguyen
(74) *Attorney, Agent, or Firm*—Cantor Colburn LLP

(57) ABSTRACT

A display substrate includes a plurality of gate lines, a plurality of data lines, a gate signal-inputting unit, a first test unit, and a first dummy switching unit. The gate lines extend in a first direction. The data lines extend in a second direction intersected with the first direction. The gate signal-inputting unit is formed at a first end of each of the gate lines to apply gate signals to the gate lines. The first test unit is formed at a second end of each of the gate lines opposite to the first end applying a first test signal to the gate lines. The first dummy switching unit is formed between the gate signal-inputting unit and the first test unit and transferring the first test signal to the gate lines.

22 Claims, 11 Drawing Sheets

DISPLAY SUBSTRATE AND METHOD OF TESTING THE DISPLAY SUBSTRATE

This application claims priority to Korean Patent Application No. 2005-114641, filed on Nov. 29, 2005 and all the benefits accruing therefrom under 35 U.S.C. §119, and the contents of which in its entirety are herein incorporated by reference.

BACKGROUND OF THE INVENTION

1. Field of the Invention

Exemplary embodiments of the present invention relate to a display substrate and a method of testing the display substrate. More particularly, exemplary embodiments of the present invention relate to a display substrate that is tested by a simple process with improved inspection degree, and a method of testing the display substrate.

2. Description of the Related Art

Generally, a liquid crystal display ("LCD") device includes an LCD panel and a driving unit electrically connected to the LCD panel to drive the LCD panel.

The LCD panel includes an array substrate, a color filter substrate facing the array substrate, and a liquid crystal (LC) layer interposed between the array substrate and the color filter substrate. In manufacturing the LCD panel, defects such as particles cause a decrease of a manufacture yield. Particularly, an open and a short of a wiring due to the particles directly decreases the manufacture yield of the LCD panel.

In a method of detecting wiring failures, electrical signals are applied to the wirings in manufacturing the array substrate to test the array substrate. The LC is then injected into the LCD panel including the array substrate and the color filter substrate. Electrical signals and a backlight (or a front light) are provided to the LCD panel to perform a visual inspection with respect to the LCD panel.

To test the array substrate, array test lines are formed at the outside of a display cell in a base substrate. The electrical signals are applied to the array substrate through the array test lines. After testing the array substrate, the base substrate is cut by each of the display cells.

To perform the visual test, it is required to form additional visual test lines in the display cell. The electrical signals and the backlight are provided to the LCD panel through the visual test lines to detect wiring failures and pixel failures of the LCD panel. Further, different electrical signals are applied to the wirings, respectively, to detect display failures as well as the wiring failures.

According to the conventional test method, to test the array substrate, it is required to form the additional array test lines on the base substrate. Further, to perform the visual test, it is also required to form the additional visual test lines in the display cells.

BRIEF SUMMARY OF THE INVENTION

Exemplary embodiments of the present invention provide a display substrate that is tested by a simple process with an improved inspection degree.

Exemplary embodiments of the present invention also provide a method of testing the above-mentioned display substrate.

A display substrate in accordance with exemplary embodiments of the present invention includes a plurality of gate lines, a plurality of data lines, a gate signal-inputting unit, a first test unit and a first dummy switching unit. The gate lines extend in a first direction. The data lines extend in a second direction intersected with the first direction. The gate signal-inputting unit is formed at a first end of each of the gate lines to apply gate signals to the gate lines. The first test unit is formed at a second end of each of the gate lines opposite to the first end applying a first test signal to the gate lines. The first dummy switching unit is formed between the gate signal-inputting unit and the first test unit transferring the first test signal to the gate lines.

In a method of testing a display substrate in accordance with exemplary embodiments of the present invention, in which the display substrate includes data-inputting pads formed at an end of each data lines to apply data signals to the data lines, a gate signal-inputting unit formed at a first end of each gate lines to apply gate signals to the gate lines, a first test unit formed at a second end of each of the gate lines opposite, and a first dummy switching unit formed between the gate signal-inputting unit and the first test unit, the method includes applying a first control signal to the first dummy switching unit turning on the first dummy switching unit. A first test signal is applied to the first test unit activating the gate lines. A second test signal is then applied to the data-inputting pads.

In a method of testing a display substrate in accordance with other exemplary embodiments of the present invention, the method includes applying a first control signal to a first dummy switching unit formed between ends of gate lines and a first test unit, turning on the first dummy switching unit, applying a first test signal to the first test unit, transferring the first test signal to the gate lines through the first dummy switching unit, applying a second control signal to a second dummy switching unit formed between ends of data lines and a second test unit, turning on the second dummy switching unit, and applying a second test signal to the second test unit, transferring the second test signal to the data lines through the second dummy switching unit.

According to exemplary embodiments of the present invention, a test of an array substrate and a visual test of the display substrate may be carried out using only a single test line so that a test process may be simplified and may also have an improved detection degree.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

Figure 1:
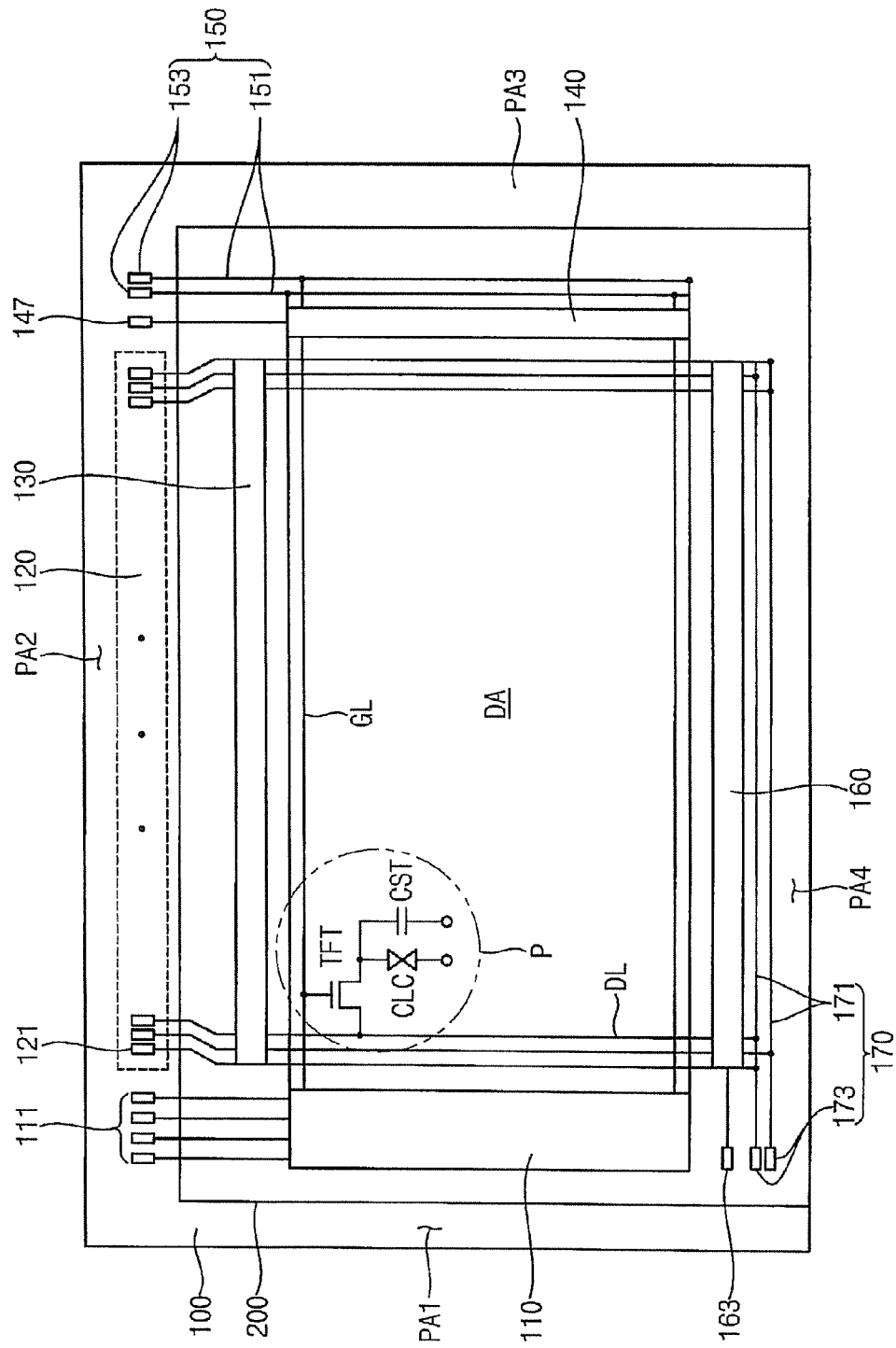
FIG. 1 is a plan view illustrating an exemplary display substrate in accordance with an exemplary embodiment of the present invention.

The present invention is described more fully hereinafter with reference to the accompanying drawings, in which example embodiments of the present invention are shown. The present invention may, however, be embodied in many different forms and should not be construed as limited to the example embodiments set forth herein. Rather, these embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like reference numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the present invention are described herein with reference to cross-section illustrations that are schematic illustrations of idealized embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
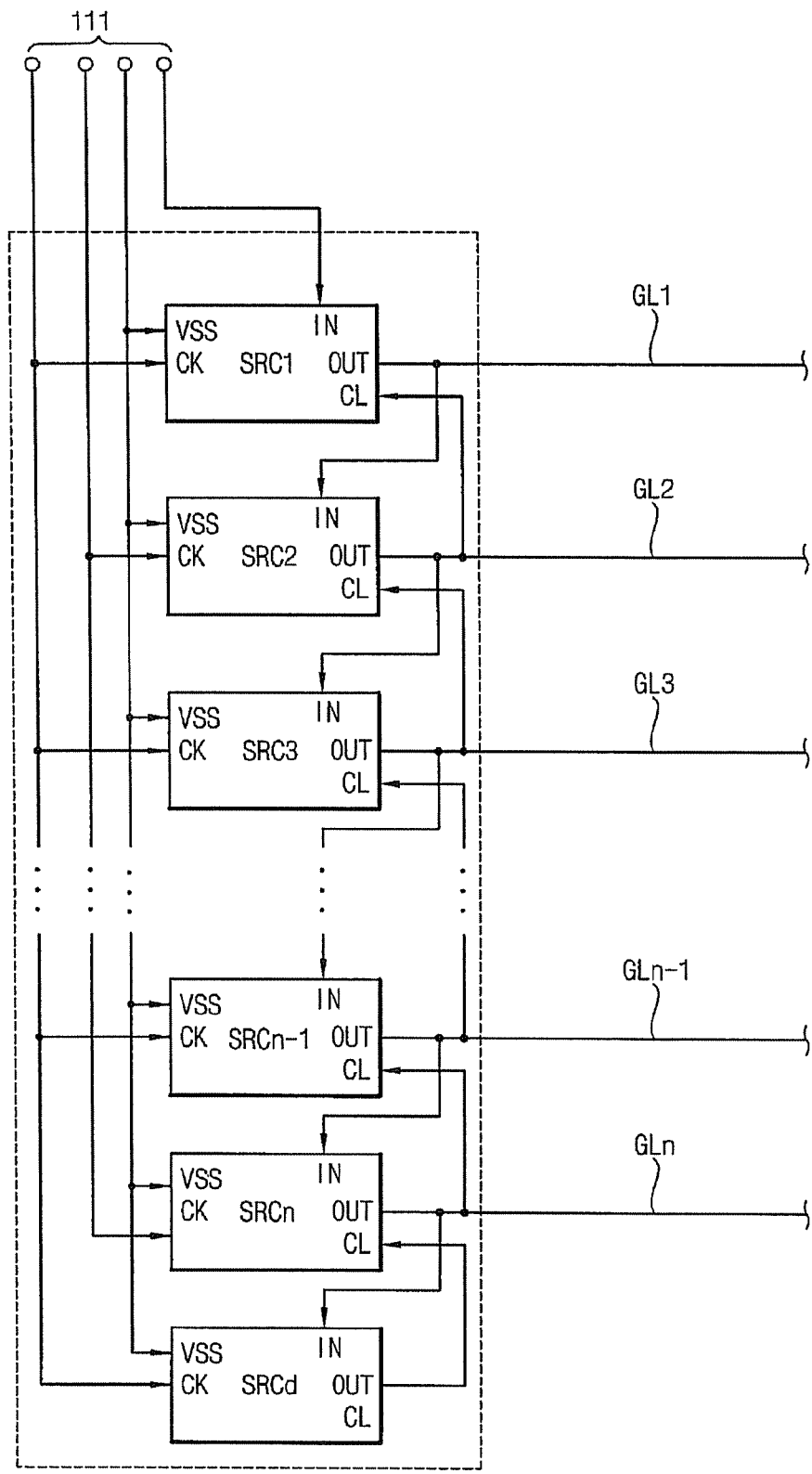
FIG. 2 is a block diagram illustrating an exemplary gate signal-inputting unit in FIG. 1.

FIG. 1 is a plan view illustrating an exemplary display substrate in accordance with an exemplary embodiment of the present invention and FIG. 2 is a block diagram illustrating an exemplary gate signal-inputting unit in FIG. 1.

Referring to FIGS. 1 and 2, a display substrate of this exemplary embodiment includes an array substrate 100, a color filter substrate 200 combined with the array substrate 100, and a liquid crystal ("LC") layer (not shown) interposed between the array substrate 100 and the color filter substrate 200. The array substrate 100 faces the color filter substrate 200.

The array substrate 100 is divided into a display region DA, and first, second, third, and fourth peripheral regions PA1, PA2, PA3, and PA4. The first, second, third, and fourth peripheral regions PA1, PA2, PA3, and PA4 surround the display region DA.

Gate lines GL, data lines DL, and a plurality of pixels P arranged in a matrix shape are formed in the display region DA. The date lines GL extend along a first direction. The data lines DL extend along a second direction substantially perpendicular to the first direction. The pixels P are defined by the gate lines GL and the data lines DL. A switching element TFT, such as a thin film transistor, a pixel electrode of an LC capacitor CLC and a storage capacitor CST are formed in each of the pixels P.

A gate signal-inputting unit 110 is formed in the first peripheral region PA1. The gate signal-inputting unit 110 is electrically connected to one end, such as a first end, of each of the gate lines GL to apply gate signals to the gate lines GL. The gate signal-inputting unit 110, as shown in FIG. 2, corresponds to a shift register to which a plurality of stages is dependently connected. The gate signal-inputting unit 110 is integrated in the first peripheral region PA1. The gate signal-inputting unit 110 includes input terminals 111 into which a plurality of gate control signals is inputted.

Referring to FIG. 2, the shift register of the gate signal-inputting unit 110 includes n stages SRC1, SRC2, . . . , SRCn and a dummy stage SRCd. The stages SRC1, SRC2, ..., SRCn and SRCd are dependently connected to each other. Each of the stages SRC1, SRC2, ..., SRCn and SRCd is formed by integrating a plurality of thin film transistors ("TFTs"). Each of the stages SRC1, SRC2, ..., SRCn and SRCd includes inputs and outputs. The input terminals 111 provide a first clock signal CKV, a second clock signal CKVB, an off voltage, and a vertical starting signal STV to inputs of the stages SRC1, SRC2, ..., SRCn and SRCd.

Each of the inputs of the stages includes an input terminal IN into which the vertical starting signal STV as an initiation signal or an output signal of a previous stage is inputted, a control terminal CL into which an output signal of a next stage or an output signal of the dummy stage SRCd is inputted, a clock terminal CK into which the first clock signal CKV or the second clock signal CKVB is inputted, and a voltage terminal VSS to which the off voltage is applied. Here, the first clock signal CKV is provided to odd-numbered stages. In contrast, the second clock signal CKVB is provided to even-numbered stages. The outputs are connected to corresponding gate lines GL to output the gate signals.

With reference again to FIG. 1, a data signal-inputting unit 120 and an electrostatic diode unit 130 are formed in the second peripheral region PA2. The data signal-inputting unit 120 includes data-inputting pads 121 for applying data signals to the data lines DL. The data-inputting pads 121 are electrically connected to output terminals of a source-driving chip to receive the data signals outputted from the source-driving chip. The electrostatic diode unit 130 distributes a static electricity from the data-inputting pads 121 to prevent damages of the pixels P due to the static electricity.

A first dummy switching unit 140 and a first test unit 150 are formed in the third peripheral region PA3. The first dummy switching unit 140 is electrically connected to another end, such as a second end opposite the first end, of each of the gate lines GL. The first test unit 150 is electrically connected to the first dummy switching unit 140.

The first dummy switching unit 140 includes a plurality of first dummy switches and a first control pad 147 into which a first control signal for controlling operations of the first dummy switches is inputted. Each of the first dummy switches is electrically connected to the second end of each of the gate lines GL.

The first test unit 150 receives a first test signal from the exterior and transmits the first test signal to the first dummy switching unit 140. The first test unit 150 includes a first test pad 153 into which the first test signal is inputted, and a first test line 151 electrically connecting the first test pad 153 to the first dummy switches of the first dummy switching unit 140. The first test signal is applied to the gate lines GL through the first dummy-switching unit 140.

The first dummy switching unit 140 transmits the first test signal to the gate lines GL responsive to the first control signal applied to the first control pad 147 and simultaneously prevents damages of the pixels P in the display region DA from the static electricity that is generated in a manufacture process.

A second dummy switching unit 160 and a second test unit 170 are formed in the fourth peripheral region PA4. The second dummy switching unit 160 is electrically connected to another end, such as a second end, of the data lines DL. The second test unit 170 is electrically connected to the second dummy switching unit 160.

The second dummy switching unit 160 includes a plurality of second dummy switches and a second control pad 163 into which a second control signal for controlling operations of the second dummy switches is inputted. Each of the second dummy switches of the second dummy switching unit 160 is electrically connected to another end, such as the second end, of each of the data lines DL.

The second test unit 170 receives a second test signal from the exterior and transmits the second test signal to the second dummy switching unit 160. The second test unit 170 includes a second test pad 173 into which the second test signal is inputted, and a second test line 171 electrically connecting the second test pad 173 to the second dummy switches of the second dummy-switching unit 160. The second test signal is applied to the data lines DL through the second dummy-switching unit 160.

The second dummy switching unit 160 transmits the second test signal to the data lines DL responsive to the second control signal applied to the second control pad 163 and simultaneously prevents damages of the pixels P in the display region DA from the static electricity that is generated in a manufacture process.

Figure 3:
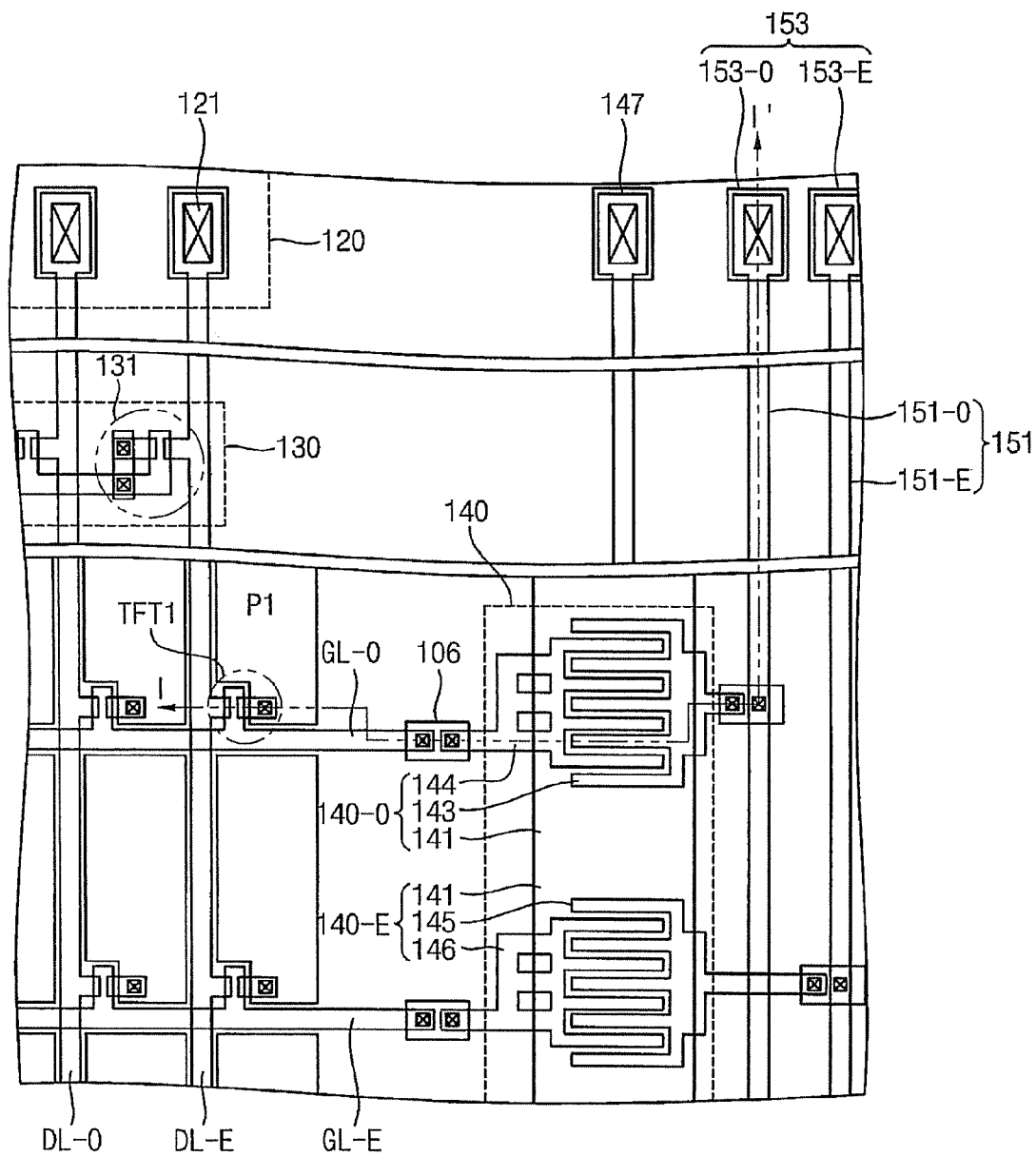
FIG. 3 is a partially enlarged plan view illustrating a portion of the exemplary array substrate in FIG. 1.
Figure 4:
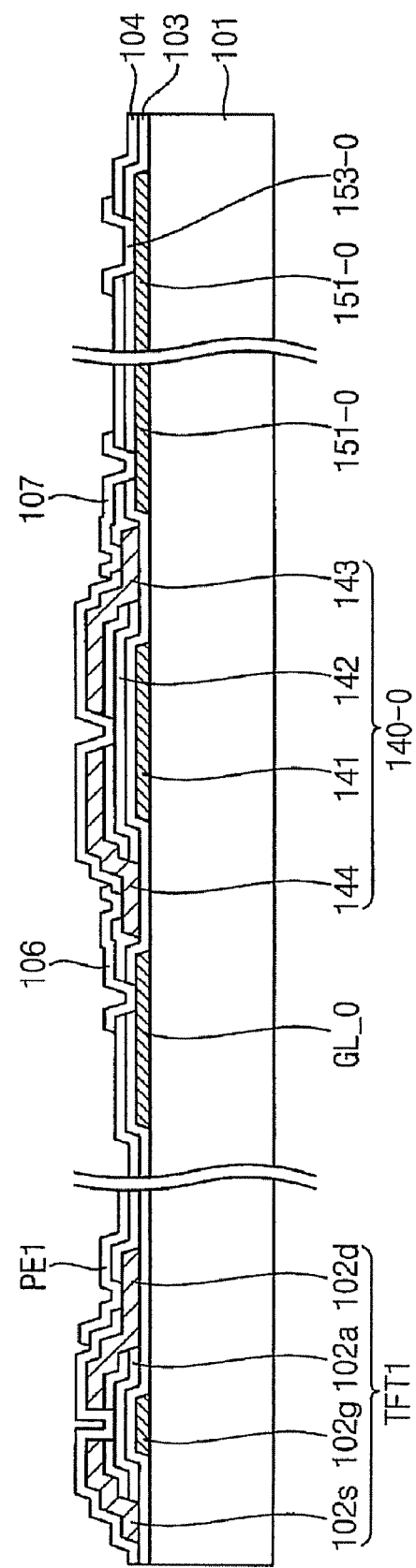
FIG. 4 is a cross-sectional view taken along line I-I' in FIG. 3.

FIG. 3 is a partially enlarged plan view illustrating a portion of the exemplary array substrate in FIG. 1 and FIG. 4 is a cross-sectional view taken along line I-I' in FIG. 3.

Referring to FIGS. 1, 3, and 4, the array substrate includes the display region DA, and the second and third peripheral regions PA2 and PA3 adjacent to the display region DA.

A plurality of the odd numbered gate lines GL-O and even numbered gate lines GL-E and a plurality of the odd numbered data lines DL-O and even numbered data lines DL-E are formed in the display region DA. The gate lines GL-O and GL-E and the data lines DL-O and DL-E define the pixels P1. The switching element TFT1 and the pixel electrode PE1 connected to the switching element TFT1 are formed in each of the pixels P1.

Particularly, the switching element TFT1 includes a gate electrode 102g, a semiconductor layer 102a, a source electrode 102s, and a drain electrode 102d. The gate electrode 102g includes a gate metal layer substantially the same as the gate lines GL-O and GL-E. The gate electrode 102g may protrude from the gate lines GL-O and GL-E. A gate insulation layer 103 is formed on the gate electrodes 102g and any exposed surfaces of the insulating substrate 101. The source electrode 102s and the drain electrode 102d include a source metal layer substantially the same as the data lines DL-O and DL-E. The source electrode 102s may protrude from the data lines DL-O and DL-E. A passivation layer 104 is formed on the source electrode 102s and the drain electrode 102d. The passivation layer 104 on the drain electrode 102d is partially removed to allow connection between the drain electrode 102d and the pixel electrode PE1.

The data signal-inputting unit 120 and the electrostatic diode unit 130 are formed in the second peripheral region PA2. The data signal-inputting unit 120 includes the data-inputting pads 121. The electrostatic diode unit 130 includes a plurality of electrostatic diodes 131 electrically connected to the data-inputting pads 121. The electrostatic diodes 131 prevent damages of the pixels P due to the static electricity from the data-inputting pads 121.

Each electrostatic diode 131 corresponds to a switching element that includes a gate electrode, a drain electrode, and a source electrode. The gate electrode and the drain electrode are commonly connected to a storage common line. The source electrode of the illustrated electrostatic diode 131 is electrically connected to the data line DL-E.

The first dummy switching unit 140 and the first test unit 150 are formed in the third peripheral region PA3.

The first dummy switching unit 140 includes the first dummy switches 140-O and 140-E corresponding to the odd-numbered gate lines GL-O and the even numbered gate lines GL-E, respectively, and the first control pad 147 into which the first control signal for controlling the operations of the first dummy switches 140-O and 140-E is applied. The first dummy switches 140-O and 140-E are electrically connected to another end, such as the second end, of each of the gate lines GL-O and GL-E.

The first test unit 150 includes a first test pad 153-O, a first test line 151-O connected to the first test pad 153-O, a second test pad 153-E, and a second test line 151-E connected to the second test pad 153-E. The first test line 151-O and the first test pad 153-O are electrically connected to the first dummy switches 140-O, and the second test line 151-E and the second test pad 153-E are electrically connected to the first dummy switches 140-E. Here, the first and second test lines 151-O and 151-E may include a material substantially the same as that of the gate metal layer, and may be formed substantially simultaneously with the gate electrode 102g and the gate lines GL-O and GL-E during a manufacturing process. Further, the first and second test pads 153-O and 153-E may include a transparent conductive material substantially the same as that of the pixel electrode PE1.

The first test signal inputted from the first test pad 153-O is transmitted to the odd-numbered first dummy switches 140-O through the first test line 151-O. The first test signal inputted from the second test pad 153-E is transmitted to the even-numbered first dummy switches 140-E through the second test line 151-E.

Thus, the first test unit 150 transmits the first test signal received from the exterior to the first dummy switching unit 140. The first dummy switching unit 140 applies the first test signal to the gate lines GL-O and GL-E responsive to the control signal applied from the first control pad 147.

Each of the odd-numbered first dummy switches 140-O includes a gate electrode 141 connected to the first control pad 147, a source electrode 143 connected to the first test line 151-O, and a drain electrode 144 connected to the odd-numbered gate line GL-O. The gate electrode 141 may be formed on the insulating substrate 101 during substantially the same manufacturing process as the gate lines GL-O and GL-E, the gate electrode 102g, and the test lines 151-O and 151-E. The even-numbered first dummy switch 140-E includes the gate electrode 141 connected to the first control pad 147, a source electrode 145 connected to the second test line 151-E, and a drain electrode 146 connected to the even-numbered gate line GL-E.

For example, the gate electrode 141 of the odd-numbered first dummy switch 140-O includes a material substantially the same as that of the gate metal layer. Further, the source electrode 143 and the drain electrode 144 may include a material substantially the same as that of the source metal layer. A semiconductor layer 142 may be formed on the gate electrode 141.

The odd-numbered gate line GL-O formed from the gate metal layer is electrically connected to the drain electrode 144 formed from the source metal layer through the contact 106. Further, the source electrode 143 formed from the source metal layer is electrically connected to the first test line 151-O formed from the gate metal layer through the contact 107.

The first dummy switching unit 140 and the first test unit 150 apply the first test signal to the gate lines GL-O and GL-E by a two-group test to detect failures of lines and pixels.

In this exemplary embodiment, to test the gate lines, the gate lines are divided into the two groups including the odd-numbered gate lines GL-O and the even-numbered gate lines GL-E. Alternatively, the gate lines GL may be divided into at least three groups within an allowable area range of the third peripheral region PA3.

Figure 5:
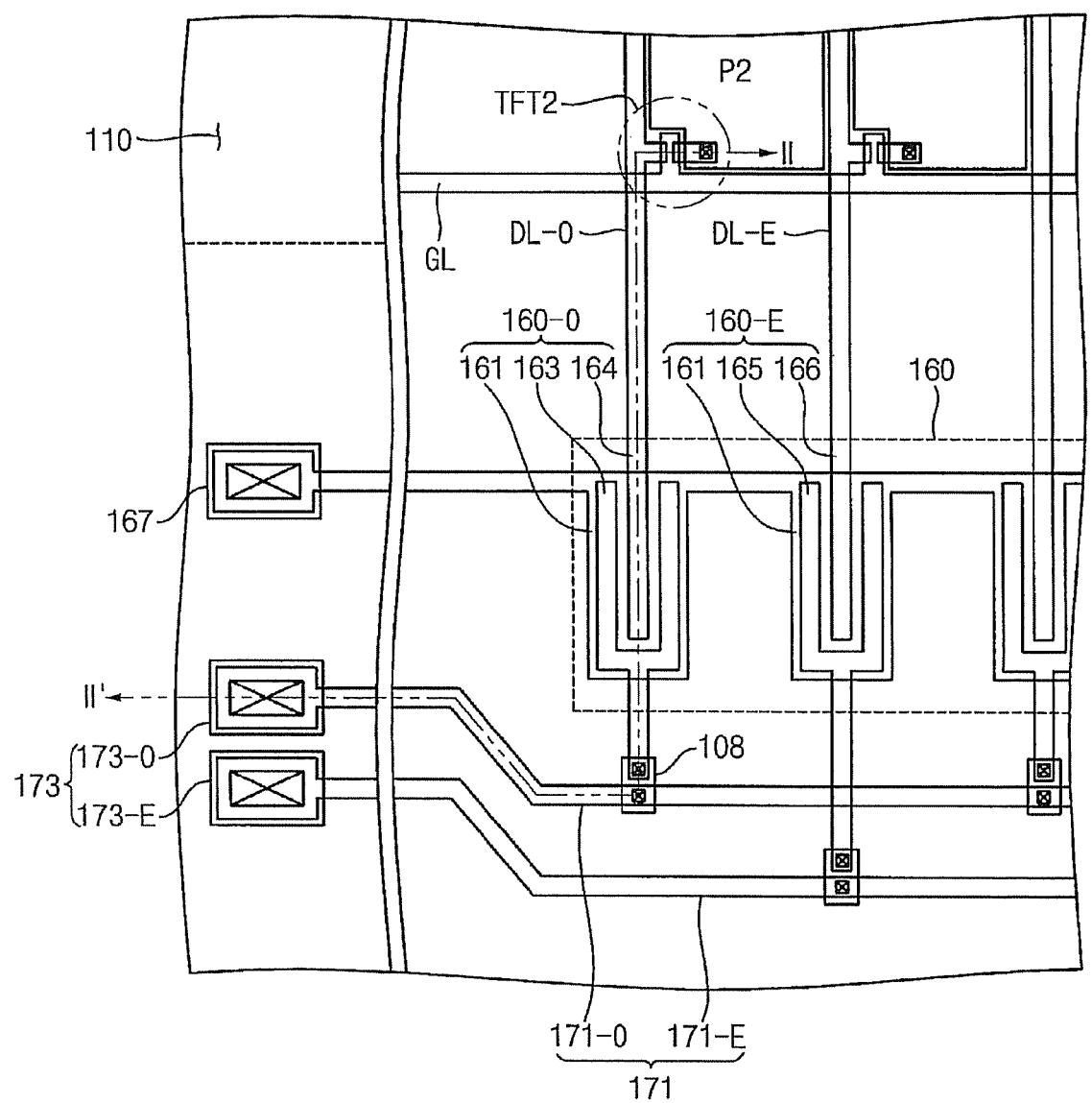
FIG. 5 is a partially enlarged plan view illustrating another portion of the exemplary array substrate in FIG. 1.
Figure 6:
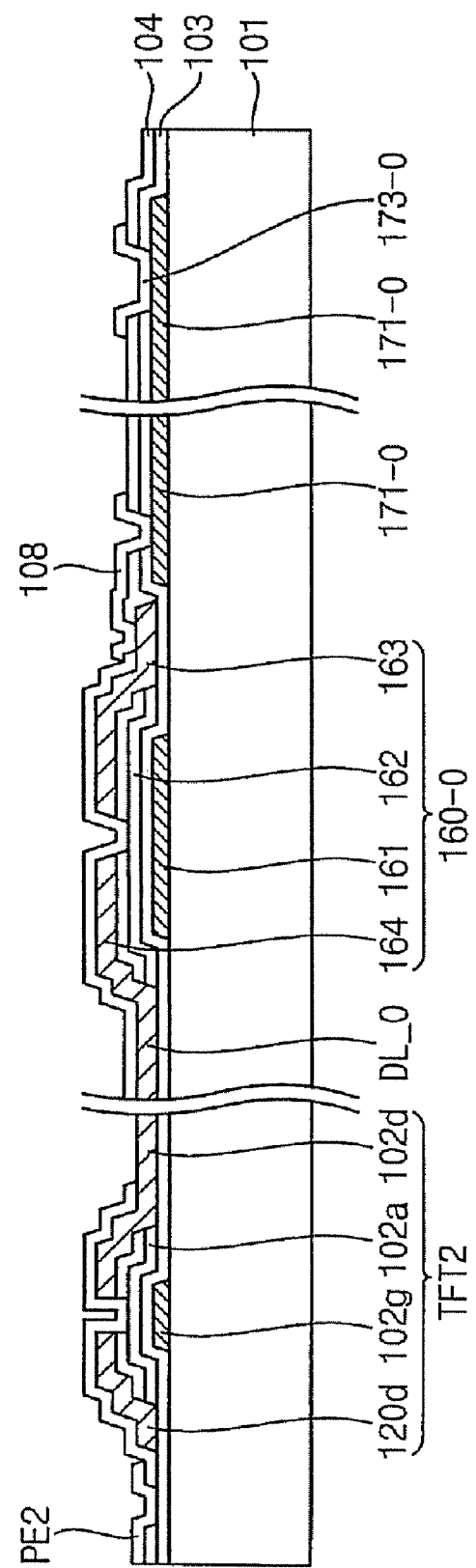
FIG. 6 is a cross-sectional view taken along line II-II' in FIG. 5.

FIG. 5 is a partially enlarged plan view illustrating another portion of the exemplary array substrate in FIG. 1 and FIG. 6 is a cross-sectional view taken along line II-II' in FIG. 5.

Referring to FIGS. 1, 5, and 6, the array substrate includes the display region DA, and the first and fourth peripheral regions PA1 and PA4 adjacent to the display region DA.

A plurality of the odd-numbered gate lines GL-O and even-numbered gate lines GL-E and a plurality of the odd-numbered data lines DL-O and even-numbered data lines DL-E are formed in the display region DA. The gate lines GL-O and GL-E and the data lines DL-O and DL-E define the pixels P2. The switching element TFT2 and the pixel electrode PE2 connected to the switching element TFT2 are formed in each of the pixels P2.

The gate signal-inputting unit 110 as the shift register is formed in the first peripheral region PA1. The shift register sequentially outputs the gate signals to the gate lines GL.

The second dummy switching unit 160 and the second test unit 170 are formed in the fourth peripheral region PA4.

The second dummy switching unit 160 includes the second dummy switches 160-O and 160-E corresponding to the odd-numbered data lines DL-O and the even-numbered data lines DL-E, respectively, and the second control pad 167 into which the second control signal for controlling the operations of the second dummy switches 160-O and 160-E are applied. The second dummy switches 160-O and 160-E are electrically connected to ends, such as second ends, of the data lines DL-O and DL-E.

The second test unit 170 includes a third test pad 173-O, a third test line 171-O connected to the third test pad 173-O, a fourth test pad 173-E, and a fourth test line 171-E connected to the fourth test pad 173-E. Here, the third and fourth test lines 171-O and 171-E may include a material substantially the same as that of the gate metal layer. Thus, the test lines 171-O and 171-E may be formed on the insulating substrate 101 during a same manufacturing process as the gate lines GL-O and GL-E. Further, the third and fourth test pads 173-O and 173-E may include a transparent conductive material substantially the same as that of the pixel electrode PE2.

The second test signal inputted from the third test pad 173-O is transmitted to the odd-numbered second dummy switches 160-O through the third test line 171-O. The second test signal inputted from the fourth test pad 173-E is transmitted to the even-numbered second dummy switches 160-E through the fourth test line 171-E.

Thus, the second test unit 170 transmits the second test signal received from the exterior to the second dummy switching unit 160. The second dummy switching unit 160 applies the second test signal to the data lines DL-O and DL-E responsive to the control signal applied from the second control pad 167 to the second dummy switching unit 160.

The odd-numbered second dummy switch 160-O includes a gate electrode 161 connected to the second control pad 167, a source electrode 163 connected to the third test line 171-O, and a drain electrode 164 connected to the odd-numbered data line DL-O. The gate electrode 161 may be formed on the insulating substrate 101 with the gate lines GL-O and GL-E and the test lines 171. The even-numbered second dummy switch 160-E includes the gate electrode 161 connected to the second control pad 167, a source electrode 165 connected to the fourth test line 171-E, and a drain electrode 166 connected to the even-numbered data line DL-E.

For example, the gate electrode 161 of the odd-numbered second dummy switch 160-O includes a material substantially the same as that of the gate metal layer. Further, the source electrode 163 and the drain electrode 164 may include a material substantially the same as that of the source metal layer, from which the data lines DL-O and DL-E are formed. A semiconductor layer 162 may be formed on the gate electrode 161.

The drain electrode 164 of the odd-numbered second dummy switch 160-O formed from the gate metal layer is electrically connected to the third test line 171-O formed from the gate metal layer through a contact 108.

The second dummy switching unit 160 and the second test unit 170 apply the second test signal to the data lines DL-O and DL-E by a two-group test to detect failures of lines and pixels.

In this exemplary embodiment, to test the data lines DL, the data lines DL are divided into the two groups including the odd-numbered data lines DL-O and the even-numbered data lines DL-E. Alternatively, the data lines DL may be divided into at least three groups within an allowable area range of the fourth peripheral region PA4.

Figure 7:
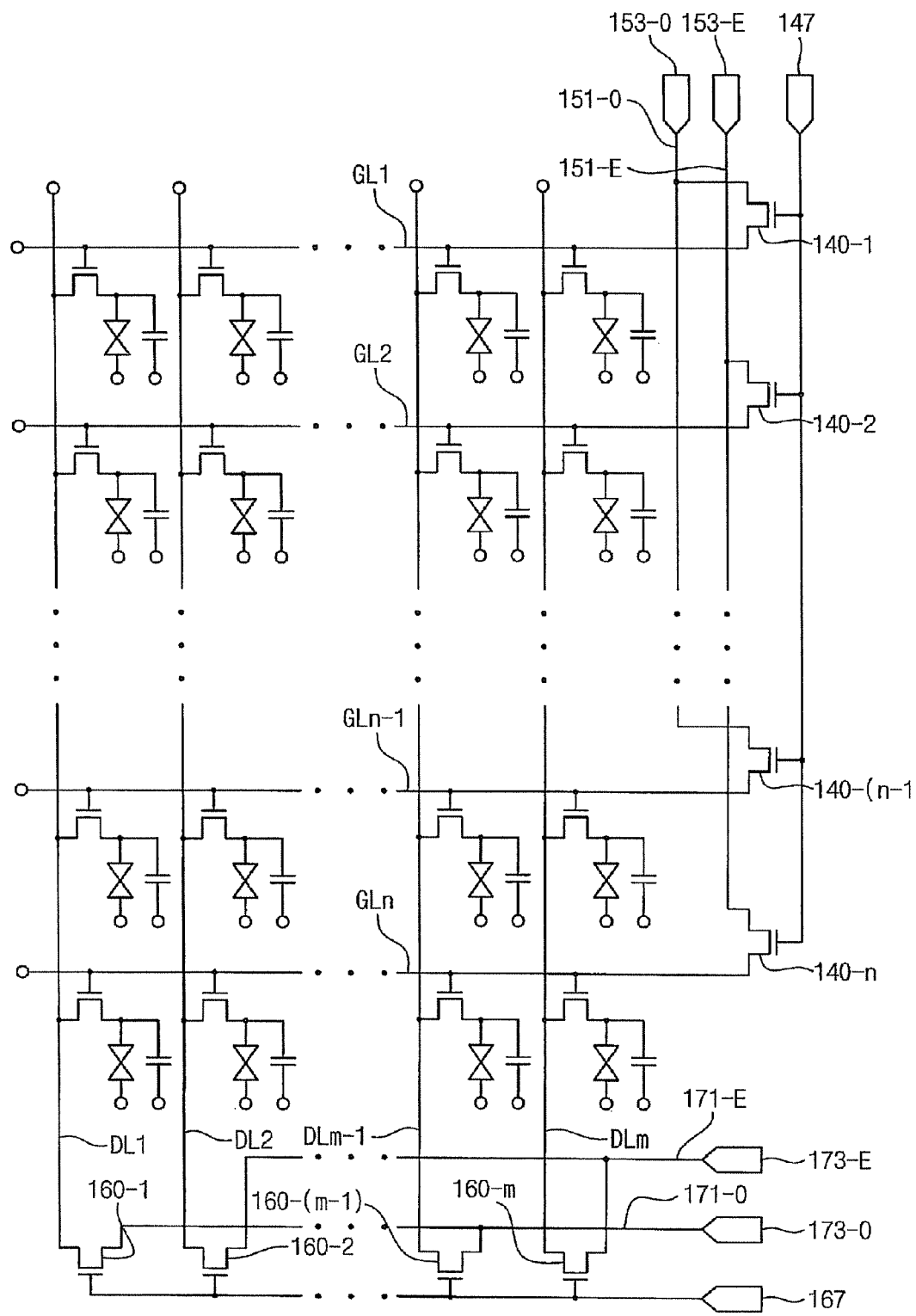
FIG. 7 is an equivalent circuit view illustrating the exemplary array substrate in FIG. 1.

FIG. 7 is an equivalent circuit view illustrating the exemplary array substrate in FIG. 1. Hereinafter, a test of the display substrate, which includes the gate lines and the data lines divided into two groups, respectively, is illustrated with reference to FIG. 7.

Referring to FIGS. 1 and 7, the display substrate includes the first dummy switching unit 140, the first test unit 150, the second dummy switching unit 160, and the second test unit 170.

The first dummy switching unit 140 includes the first dummy switches 140-1, 140-2, ..., 140-(n−1), and 140-n. The gate electrode of each of the first dummy switches 140-1, 140-2, ..., 140-(n−1), 140-n is electrically connected to the first control pad 147.

The first test unit 150 includes the first test pad 153-O, the first test line 151-O connected to the first test pad 153-O, the second test pad 153-E, and the second test line 151-E connected to the second test pad 153-E. The first test line 151-O is connected to the odd-numbered gate lines GL1, ..., GLn−1, where n is an even number. The second test line 151-E is connected to the even-numbered gate lines GL2, ..., GLn.

The second dummy switching unit 160 includes the second dummy switches 160-1, 160-2, ..., 160-(m−1), and 160-m. The gate electrode of each of the second dummy switches 160-1, 160-2, ..., 160-(m−1), 160-m is electrically connected to the second control pad 167.

The second test unit 170 includes the third test pad 173-O, the third test line 171-O connected to the third test pad 173-O, the fourth test pad 173-E and the fourth test line 171-E connected to the fourth test pad 173-E. The third test line 171-O is connected to the odd-numbered data lines DL1, ..., DLm−1, where m is an even number. The fourth test line 171-E is connected to the even-numbered data lines DL2, ..., DLm.

The array substrate is tested as follows.

The first control signal is applied to the first control pad 147 to turn on the first dummy switching unit 140. The first test signals, corresponding to a gate signal that activates the gate lines GL1, ..., GLn, are applied to the first and second test pads 153-O and 153-E of the first test unit 150. For example, the first test signal has a voltage of about −7V to about 25V.

The second control signal is applied to the second control pad 167 to turn on the second dummy switching unit 160. The second test signals, corresponding to a data signal that is applied to the data lines DL1, ..., DLn are applied to the third and fourth test pads 173-O and 173-E of the second test unit 170. For example, the second test signal has a voltage of about 0V to about 10V.

Here, the second test signals applied to the third and fourth test pads 173-O and 173-E may have a substantially same gradation level or different gradation levels. When the second test signals having the different gradation levels are applied to the third and fourth test pads 173-O and 173-E, a pixel P connected to an odd data line DL-O exhibits a gray level different from that of a pixel P connected to an even data line DL-E so that display failures of the array substrate may be detected.

Thus, an array test may be performed on a base substrate by the above-mentioned manner. Further, a visual test may be carried out on the display substrate by the above-mentioned manner using the same test lines.

Figure 8:
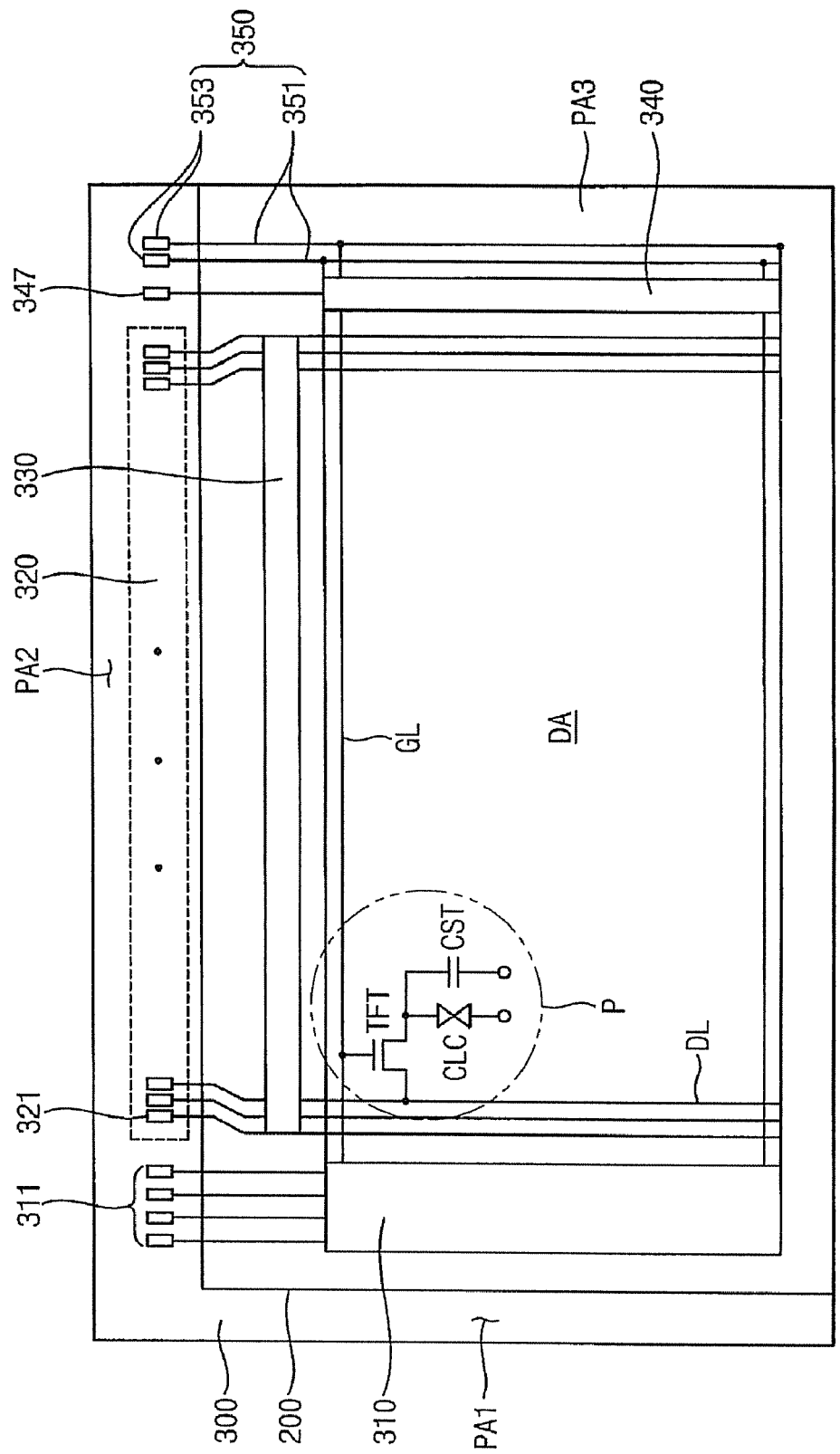
FIG. 8 is a plan view illustrating an exemplary display panel in accordance with another exemplary embodiment of the present invention.

FIG. 8 is a plan view illustrating an exemplary display panel in accordance with another exemplary embodiment of the present invention.

Referring to FIG. 8, a display substrate of this exemplary embodiment includes an array substrate 300, a color filter substrate 200 combined with the array substrate 300, and an LC layer (not shown) interposed between the array substrate 300 and the color filter substrate 200. The array substrate 300 faces the color filter substrate 200.

The array substrate 300 is divided into a display region DA, and first, second, and third peripheral regions PA1, PA2, and PA3. The first, second, and third peripheral regions PA1, PA2, and PA3 surround the display region DA.

Gate lines GL, data lines DL, and a plurality of pixels P are formed in the display region DA. The gate lines GL extend along a first direction. The data lines DL extend along a second direction substantially perpendicular to the first direction. The pixels P are defined by the gate lines GL and the data lines DL. A switching element TFT, such as a thin film transistor, a pixel electrode of an LC capacitor CLC and a storage capacitor CST are formed in each of the pixels P.

A gate signal-inputting unit 310 is formed in the first peripheral region PA1. The gate signal-inputting unit 310 is electrically connected to one end, such as a first end, of each of the gate lines GL to apply gate signals to the gate lines GL. The gate signal-inputting unit 310 corresponds to a shift register, such as that shown in FIG. 2, to which a plurality of stages is dependently connected. The gate signal-inputting unit 310 is integrated in the first peripheral region PA1. The gate signal-inputting unit 310 includes input terminals 311 into which a plurality of gate control signals is inputted.

A data signal-inputting unit 320 and an electrostatic diode unit 330 are formed in the second peripheral region PA2. The data signal-inputting unit 320 includes data-inputting pads 321 for applying data signals to the data lines DL. The data-inputting pads 321 are electrically connected to output terminals of a source-driving chip to receive the data signals outputted from the source-driving chip. The electrostatic diode unit 330 distributes a static electricity from the data-inputting pads 321 to prevent damages of the pixels P due to the static electricity.

A dummy switching unit 340 and a test unit 350 are formed in the third peripheral region PA3. The dummy-switching unit 340 is electrically connected to another end, such as a second end, of each of the gate lines GL. The test unit 350 is electrically connected to the dummy switching unit 340.

The dummy switching unit 340 includes a plurality of dummy switches and a control pad 347 into which a control signal for controlling operations of the dummy switches is inputted. Each of the dummy switches is electrically connected to another end, such as the second end, of each of the gate lines GL.

The test unit 350 receives a test signal from the exterior and transmits the test signal to the dummy-switching unit 340.

The test unit 350 includes a test pad 353 into which the test signal is inputted, and a test line 351 electrically connected to the dummy switches. The test signal is applied to the gate lines GL through the dummy-switching unit 340.

The dummy switching unit 340 transfers the test signal to the gate lines GL in response to the control signal applied to the control pad 347 and also prevents damages in the pixel, which may be generated in the manufacturing process due to the static electrical effects.

Figure 9:
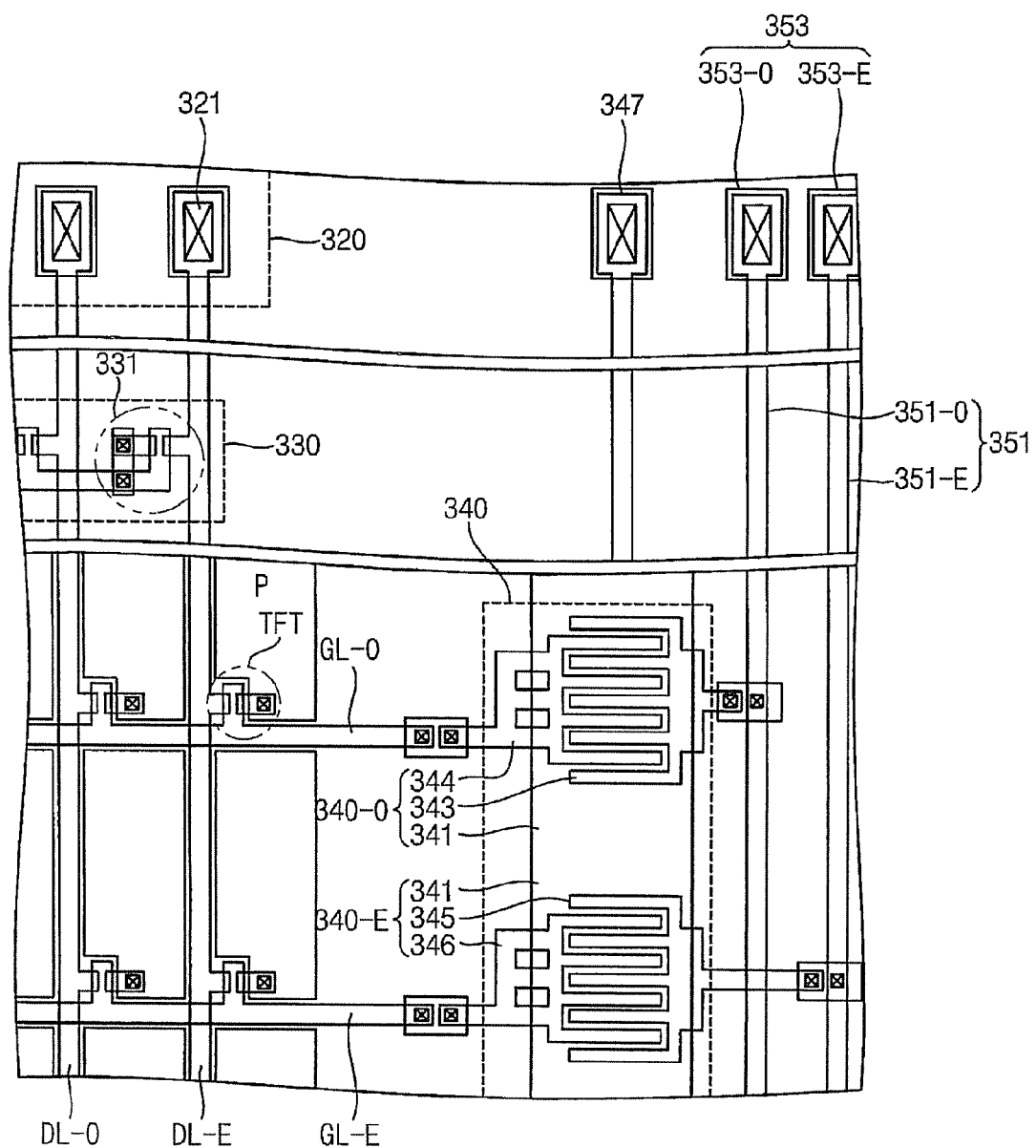
FIG. 9 is a partially enlarged plan view illustrating the exemplary array substrate in FIG. 8.

FIG. 9 is a partially enlarged plan view illustrating the exemplary array substrate in FIG. 8.

Referring to FIGS. 8 and 9, the array substrate includes the display region DA, and the second and third peripheral regions PA2 and PA3 adjacent to the display region DA.

A plurality of the odd-numbered gate lines GL-O and even-numbered gate lines GL-E and a plurality of the odd-numbered data lines DL-O and even-numbered data lines DL-E are formed in the display region DA. The gate lines GL-O and GL-E and the data lines DL-O and DL-E define the pixels P. The switching element TFT and the pixel electrode PE connected to the switching element TFT are formed in each of the pixels P.

The data signal-inputting unit 320 and the electrostatic diode unit 330 are formed in the second peripheral region PA2. The data signal-inputting unit 320 includes the data-inputting pads 321. The electrostatic diode unit 330 includes a plurality of electrostatic diodes 331 electrically connected to the data-inputting pads 321. The electrostatic diode 332 corresponds to a switching element that includes a gate electrode, a drain electrode, and a source electrode. The gate electrode and the drain electrode are commonly connected to a storage common line. In the illustrated electrostatic diode 331 in FIG. 9, the source electrode is electrically connected to the data line DL-E.

The dummy switching unit 340 and the test unit 350 are formed in the third peripheral region PA3. The dummy switching unit 340 includes the dummy switches 340-O and 340-E corresponding to the odd-numbered gate lines GL-O and even-numbered gate lines GL-E, respectively, and the control pad 347 into which the control signal for controlling the operations of the dummy switches 340-O and 340-E is applied. The dummy switches 340-O and 340-E are electrically connected to another end, such as the send end, of each of the gate lines GL-O and GL-E.

The test unit 350 includes a first test pad 353-O, a first test line 351-O connected to the first test pad 353-O, a second test pad 353-E, and a second test line 351-E connected to the second test pad 353-E.

The test signal inputted from the first test pad 353-O is transmitted to the odd-numbered dummy switches 340-O through the first test line 351-O. The test signal inputted from the second test pad 353-E is transmitted to the even-numbered dummy switches 340-E through the second test line 351-E.

Thus, the test unit 350 transmits the test signal received from the exterior to the dummy-switching unit 340. The dummy-switching unit 340 applies the test signal to the gate lines GL-O and GL-E responsive to the control signal applied from the control pad 347.

Each of the odd-numbered dummy switches 340-O includes a gate electrode 341 connected to the control pad 347, a source electrode 343 connected to the first test line 351-O, and a drain electrode 344 connected to the odd-numbered gate line GL-O. The gate electrode 341 may be formed from the same gate metal layer as the gate lines GL-O and GL-E. The even-numbered dummy switch 340-E includes the gate electrode 341 connected to the control pad 347, a source electrode 345 connected to the second test line 351-E, and a drain electrode 346 connected to the even-numbered gate line GL-E.

The dummy switching unit 340 and the test unit 350 apply the test signal to the gate lines GL-O and GL-E, which are divided into two groups, to detect failures of the gate lines GL-O and GL-E and the pixels P.

In this exemplary embodiment, to test the gate lines GL, the gate lines GL are divided into the two groups including the odd-numbered gate lines GL-O and the even-numbered gate lines GL-E. Alternatively, the gate lines GL may be divided into at least three groups within an allowable area range of the third peripheral region PA3.

Further, in this exemplary embodiment, to apply the test signal to the data lines DL-O and DL-E, probe pins of a tester make contact with the data-inputting pads 121, respectively.

Figure 10:
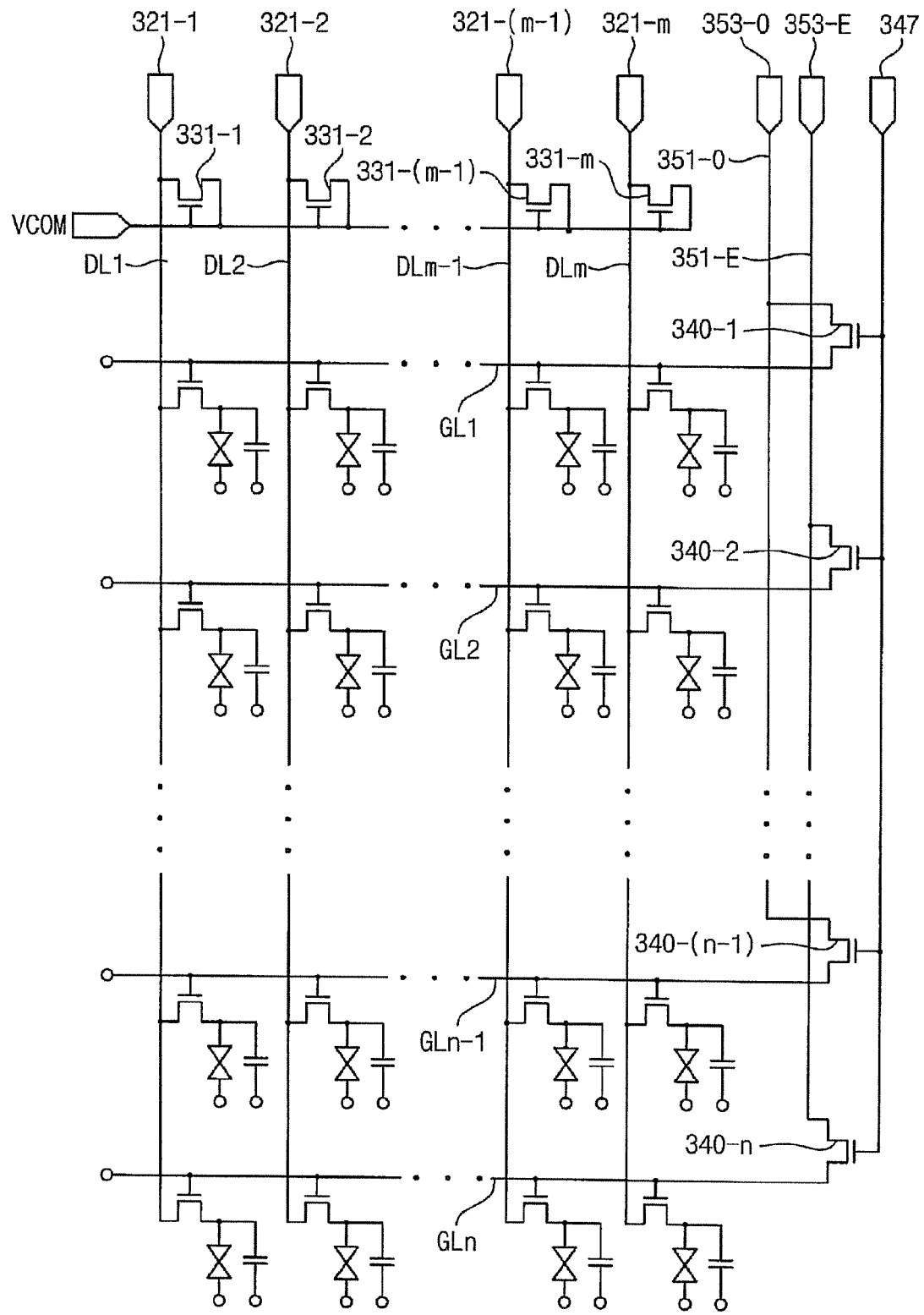
FIG. 10 is an equivalent circuit view illustrating the exemplary array substrate in FIG. 8.

FIG. 10 is an equivalent circuit view illustrating the exemplary array substrate in FIG. 8. Hereinafter, a test of the exemplary display substrate is illustrated with reference to FIG. 10.

Referring to FIGS. 8 through 10, the display substrate includes the data-inputting unit 320, the electrostatic diode unit 330, the dummy switching unit 340, and the test unit 350.

The data-inputting unit 320 includes a plurality of data-inputting pads 321-1, 321-2, . . . , 321-($m$−1), and 321-$m$ that are formed at ends of the data lines DL1, DL2, , , , DLm−1 and DLm.

The electrostatic diode unit 330 includes a plurality of electrostatic diodes 331-1, 331-2, . . . , 331-($m$−1), and 331-$m$. A gate electrode and a drain electrode of each of the electrostatic diodes 331-1, 331-2, . . . , 331-($m$−1), and 331-$m$ are electrically connected to a voltage pad VCOM that is electrically connected to a storage common line. A source electrode of each of the electrostatic diodes 331-1, 331-2, . . . , 331-($m$−1), and 331-$m$ is electrically connected to the data-inputting pads 321-1, 321-2, . . . , 321-($m$−1), and 321-$m$.

The dummy switching unit 340 includes the dummy switches 340-1, 340-2, . . . , 340-($n$−1), and 340-$n$. A gate electrode of each of the dummy switches 340-1, 340-2, . . . , 340-($n$−1), 340-$n$ is electrically connected to the control pad 347.

The test unit 350 includes the first test pad 353-O, the first test line 351-O connected to the first test pad 353-O, the second test pad 353-E, and the second test line 351-E connected to the second test pad 353-E. The first test line 351-O is connected to the odd-numbered gate lines GL1, . . . , GLn−1, where n is an even number. The second test line 351-E is connected to the even-numbered gate lines GL2, . . . , GLn.

The array substrate is tested as follows.

The control signal is applied to the control pad 347 to turn on the dummy-switching unit 340. The first test signals corresponding to a gate signal that activates the gate lines GL1, . . . , GLn are applied to the first and second test pads 353-O and 353-E of the test unit 350. For example, the first test signal has a voltage of about −7V to about 25V.

A storage common voltage is applied to the voltage pad VCOM. The second control signal is applied to the data-inputting pads 321-1, 321-2, . . . , 321-($m$−1) and 321-$m$. The probe pins of the tester make contact with the data-inputting pads 321-1, 321-2, . . . , 321-($m$−1), and 321-$m$, respectively, to apply the second test signal to the data-inputting pads 321-1, 321-2, . . . , 321-($m$−1), and 321-$m$. For example, the second test signal has a voltage of about 0V to about 10V.

Here, the second test signals applied to the data-inputting pads 321-1, 321-2, . . . , 321-($m$−1), and 321-$m$ may have different gradation levels. When the second test signals having the different gradation levels are applied, display failures of the array substrate may be detected.

Thus, an array test may be performed on a base substrate by the above-mentioned manner. Further, a visual test may be carried out on the display substrate by the above-mentioned manner.

Figure 11:
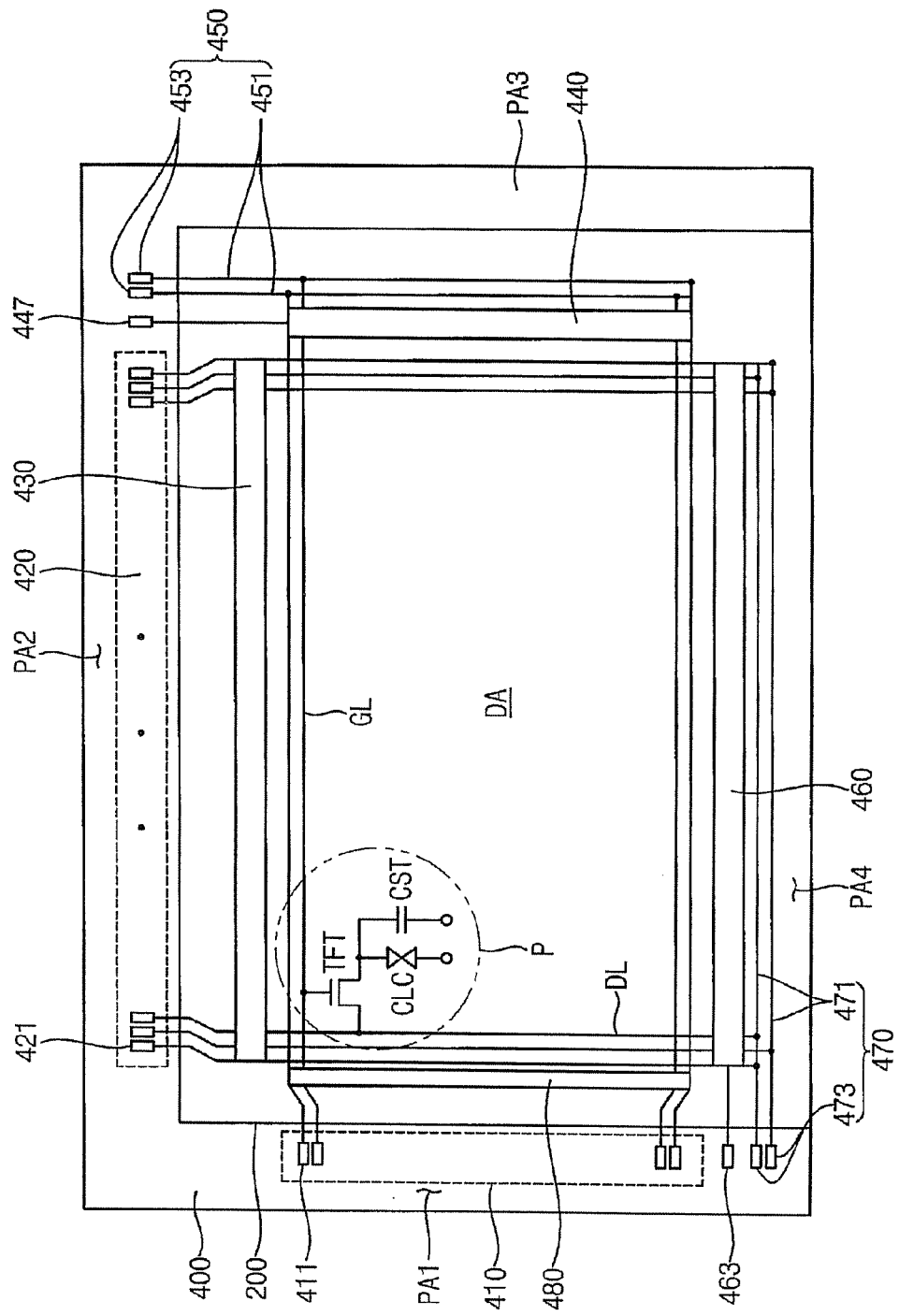
FIG. 11 is a plan view illustrating an exemplary display panel in accordance with still another exemplary embodiment of the present invention.

FIG. 11 is a plan view illustrating an exemplary display panel in accordance with still another exemplary embodiment of the present invention.

Referring to FIG. 11, a display substrate of this exemplary embodiment includes an array substrate 400, a color filter substrate 200 combined with the array substrate 400, and an LC layer (not shown) interposed between the array substrate 400 and the color filter substrate 200. The array substrate 400 faces the color filter substrate 200.

The array substrate 400 is divided into a display region DA, and first, second, third, and fourth peripheral regions PA1, PA2, PA3, and PA4. The first, second, third, and fourth peripheral regions PA1, PA2, PA3, and PA4 surround the display region DA.

Gate lines GL, data lines DL, and a plurality of pixels P are formed in the display region DA in a matrix configuration. The gate lines GL extend along a first direction. The data lines DL extend along a second direction substantially perpendicular to the first direction. The pixels P are defined by the gate lines GL and the data lines DL. A switching element TFT, such as a thin film transistor, a pixel electrode of an LC capacitor CLC, and a storage capacitor CST are formed in each of the pixels P.

A gate signal-inputting unit 410 and a first electrostatic diode unit 480 are formed in the first peripheral region PA1.

The gate signal-inputting unit 410 includes gate-inputting pads 411 formed at ends, such as first ends, of the gate lines GL. The gate-inputting pads 411 are electrically connected to output terminals of gate-driving chips to apply gate signals to the gate-driving chips.

The first electrostatic diode unit 480 is electrically connected to the gate-inputting pads 411. The first electrostatic diode unit 480 distributes a static electricity from the gate-inputting pads 411 to prevent damages of the pixels P due to the static electricity.

A data signal-inputting unit 420 and a second electrostatic diode unit 430 are formed in the second peripheral region PA2.

The data signal-inputting unit 420 includes data-inputting pads 421 formed at ends, such as first ends, of the data lines DL. The data-inputting pads 421 are electrically connected to output terminals of a source-driving chip to receive the data signals outputted from the source-driving chip.

The second electrostatic diode unit 430 is electrically connected to the data-inputting pads 421. The second electrostatic diode unit 430 distributes a static electricity from the data-inputting pads 421 to prevent damages of the pixels P due to the static electricity.

A first dummy switching unit 440 and a first test unit 450 are formed in the third peripheral region PA3. The first dummy switching unit 440 is electrically connected to another end, such as a second end, of each of the gate lines GL. The first test unit 450 is electrically connected to the first dummy switching unit 440.

The first dummy switching unit 440 includes a plurality of first dummy switches and a first control pad 447 into which a first control signal for controlling operations of the first dummy switches of the first dummy switching unit 440 is inputted. The first test unit 450 receives a first test signal from the exterior and transmits the first test signal to the first dummy switching unit 440. The first test unit 450 includes a first test pad 453 into which the first test signal is inputted, and a first test line 451 electrically connected to the first dummy switches of the first dummy switching unit 440. Here, the first dummy switching unit 440 and the first test unit 450 are substantially the same as those illustrated with reference to FIGS. 3 and 4. Thus, any further explanations with respect to the first dummy switching unit 440 and the first test unit 450 are omitted herein for brevity.

A second dummy switching unit 460 and a second test unit 470 are formed in the fourth peripheral region PA4. The second dummy switching unit 460 is electrically connected to another end, such as a second end, of the data lines DL. The second test unit 470 is electrically connected to the second dummy switching unit 460.

The second dummy switching unit 460 includes a plurality of second dummy switches and a second control pad 463 into which a second control signal for controlling operations of the second dummy switches of the second dummy switching unit 460 is inputted. The second test unit 470 receives a second test signal from the exterior and transmits the second test signal to the second dummy switching unit 460. The second test unit 470 includes a second test pad 473 into which the second test signal is inputted, and a second test line 471 electrically connected to the second dummy switches of the second dummy switching unit 460. Here, the second dummy switching unit 460 and the second test unit 470 are substantially the same as those illustrated with reference to FIGS. 5 and 6. Thus, any further illustrations with respect to the second dummy switching unit 460 and the second test unit 470 are omitted herein for brevity.

Further, a test of the array substrate in accordance with this exemplary embodiment is substantially the same as that illustrated with reference to FIG. 7. Thus, any further illustrations with respect to the test are omitted herein for brevity.

According to exemplary embodiments of the present invention, the first test unit is provided at one end of the gate line that is opposite to another end of the gate line into which the gate signal is inputted so that the test signal is applied to the gate line through the first test unit. As a result, the failures of the lines and the pixels may be accurately detected.

Further, the second test unit is provided at one end of the data line that is opposite to another end of the data line into which the data signal is inputted so that the test signal is applied to the data line through the second test unit. As a result, the failures of the lines and the pixels may be accurately detected.

Furthermore, the first and second test units are arranged in the display cell so that the array test and the visual test may be readily carried out.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A display substrate comprising:
   a plurality of gate lines extending along a first direction;
   a plurality of data lines extending along a second direction intersected with the first direction;
   a gate signal-inputting unit formed at first ends of the gate lines to apply a gate signal to the gate lines;
   a first test unit formed at second ends of the gate lines opposite to the first ends and receiving a first test signal; and
   a first dummy switching unit formed between the gate signal-inputting unit and the first test unit and transmitting the first test signal to the gate lines.

2. The display substrate of claim 1, wherein the first dummy switching unit comprises:
   a plurality of first dummy switches electrically connected to the gate lines, respectively; and
   a first control pad applying a control signal to the first dummy switches.

3. The display substrate of claim 2, wherein each of the first dummy switches comprises:
   a gate electrode electrically connected to the first control pad;
   a source electrode electrically connected to the first test unit; and
   a drain electrode electrically connected to one of the gate lines.

4. The display substrate of claim 2, wherein the first test unit comprises:
   a plurality of test lines, each test line applying the first test signal to a group of the first dummy switches; and
   a plurality of test pads electrically connected to the plurality of test lines, respectively.

5. The display substrate of claim 2, wherein the first test unit comprises:
   a first test line applying the first test signal to odd-numbered first dummy switches among the first dummy switches;
   a first test pad electrically connected to the first test line;
   a second test line applying the first test signal to even-numbered first dummy switches; and
   a second test pad electrically connected to the second test line.

6. The display substrate of claim 1, wherein the gate signal-inputting unit comprises gate-inputting pads electrically connected to outputs of a gate-driving chip.

7. The display substrate of claim 1, wherein the gate signal-inputting unit comprises a shift register dependently connected to a plurality of stages to output the gate signals.

8. The display substrate of claim 1, further comprising:
   a data signal-inputting unit formed at first ends of the data lines to apply data signals to the data lines;
   a second test unit formed at second ends of the data lines opposite to the first ends and outputting a second test signal to the data lines; and
   a second dummy switching unit formed between the data signal-inputting unit and the second test unit and transmitting the second test signal to the data lines.

9. The display substrate of claim 8, wherein the second dummy switching unit comprises:
   a plurality of dummy switches electrically connected to the data lines, respectively; and
   a control pad applying a control signal to the dummy switches.

10. The display substrate of claim 9, wherein each of the dummy switches comprises:
    a gate electrode electrically connected to the control pad;
    a source electrode electrically connected to the second test unit; and
    a drain electrode electrically connected to one of the data lines.

11. The display substrate of claim 9, wherein the second test unit comprises:
    a plurality of test lines, each test line applying the second test signal to a group of the dummy switches; and
    a plurality of test pads electrically connected to the plurality of test lines, respectively.

12. The display substrate of claim 9, wherein the second test unit comprises:
    a first test line applying the second test signal to odd-numbered dummy switches among the dummy switches;
    a first test pad electrically connected to the first test line;
    a second test line applying the second test signal to even-numbered dummy switches; and
    a second test pad electrically connected to the second test line.

13. The display substrate of claim 12, wherein the second test signal applied to the first test pad has a different voltage level from the second test signal applied to the second test pad.

14. The display substrate of claim 8, wherein the data signal-inputting unit comprises data-inputting pads electrically connected to outputs of a source-driving chip.

15. A method of testing a display substrate, the display substrate including data-inputting pads formed at ends of data lines to apply data signals to the data lines, a gate signal-inputting unit formed at first ends of gate lines to apply gate signals to the gate lines, a first test unit formed at second ends of the gate lines opposite to the first ends, and a first dummy switching unit formed between the gate signal-inputting unit and the first test unit, the method comprising:
    applying a first control signal to the first dummy switching unit turning on the first dummy switching unit;
    applying a first test signal to the first test unit activating the gate lines; and,
    applying a second test signal to the data-inputting pads.

16. The method of claim 15, wherein the gate signal-inputting unit comprises a shift register dependently connected to a plurality of stages and outputting the gate signals.

17. The method of claim 15, wherein the first dummy switching unit comprises a plurality of first dummy switches electrically connected to the gate lines, respectively, and
    applying the first test signal includes a first test line of the first test unit applying the first test signal to odd-numbered first dummy switches among the first dummy switches, a first test pad electrically connected to the first test line, a second test line of the first test unit applying the first test signal to even-numbered first dummy switches, and a second test pad electrically connected to the second test line.

18. The method of claim 15, wherein the array substrate further comprises a second dummy switching unit electrically connected to the data-inputting pads, and a second test unit electrically connected to the second dummy switching unit, and
    applying the second test signal comprises applying a second control signal to the second dummy switching unit turning on the second dummy switching unit, and applying the second test signal, which is applied to the data lines, to the second test unit.

19. The method of claim 18, wherein the second dummy switching unit comprises a plurality of dummy switches electrically connected to the data lines, respectively, and applying the second test signal further comprises a first test line of the second test unit applying the second test signal to odd-numbered dummy switches among the dummy switches, a first test pad electrically connected to the first test line, a second test line of the second test unit applying the second test signal to even-numbered dummy switches, and a second test pad electrically connected to the second test line.

20. The method of claim 19, wherein the second test signal applied to the first test pad has a different voltage level from the second test signal applied to the second test pad.

21. The method of claim 15, wherein applying a second test signal to the data-inputting pads includes contacting probe pins of a tester with the data-inputting pads.

22. A method of testing a display substrate, the method comprising:

applying a first control signal to a first dummy switching unit formed between ends of gate lines and a first test unit, turning on the first dummy switching unit;

applying a first test signal to the first test unit, transferring the first test signal to the gate lines through the first dummy switching unit;

applying a second control signal to a second dummy switching unit formed between ends of data lines and a second test unit, turning on the second dummy switching unit; and, applying a second test signal to the second test unit, transferring the second test signal to the data lines through the second dummy switching unit.

* * * * *